United States Patent

Kadouchi et al.

[11] Patent Number: 5,680,030
[45] Date of Patent: Oct. 21, 1997

[54] CONDITION MANAGING SYSTEM OF STORAGE BATTERY FOR A MOVABLE BODY

[75] Inventors: Eiji Kadouchi, Hirakata; Yuichi Watanabe, Tokyo; Megumi Kinoshita, Fujisawa; Noboru Ito, Kadoma; Kanji Takata, Neyagawa, all of Japan

[73] Assignee: Matsushita Electric Industrial Co., Ltd., Kadoma, Japan

[21] Appl. No.: 663,212
[22] PCT Filed: Nov. 7, 1995
[86] PCT No.: PCT/JP95/02273
§ 371 Date: Sep. 5, 1996
§ 102(e) Date: Sep. 5, 1995
[87] PCT Pub. No.: WO96/14669
PCT Pub. Date: May 17, 1996

[30] Foreign Application Priority Data

Nov. 8, 1994 [JP] Japan ................... 6-273593

[51] Int. Cl.$^6$ .................... H01M 10/44; H01M 10/46
[52] U.S. Cl. ...................... 320/15; 320/30; 320/48
[58] Field of Search ....................... 320/6, 15, 21, 320/30, 32, 35, 43, 48; 324/427, 431, 433; 340/636; 429/61, 90, 149

[56] References Cited

U.S. PATENT DOCUMENTS

| | | |
|---|---|---|
| 4,907,223 | 3/1990 | Wroblewski . |
| 4,968,942 | 11/1990 | Palanisamy .................. 324/430 |
| 5,148,043 | 9/1992 | Hirata et al. .................. 320/32 X |
| 5,525,890 | 6/1996 | Iwatsu et al. .................. 320/1.5 X |
| 5,576,611 | 11/1996 | Yoshida .................. 320/35 X |

FOREIGN PATENT DOCUMENTS

| | | |
|---|---|---|
| 0 444 997 | 9/1991 | European Pat. Off. . |
| 55-151773 | 11/1980 | Japan . |
| 5-276677 | 10/1993 | Japan . |
| 7-222374 | 8/1995 | Japan . |

*Primary Examiner*—Edward Tso
*Attorney, Agent, or Firm*—Panitch Schwarze Jacobs & Nadel, P.C.

[57] ABSTRACT

A condition managing system for a storage battery which is used as a drive power source for a movable body such as an electric car and which is formed by a number of sealed nickel/hydrogen storage batteries, comprises a battery pack 1, a detection unit 2 for detecting the condition of a battery pack, a battery condition judging unit 3, a movable body signal control part 4, a battery charger 5 for charging up the battery pack 1 under the control of a signal which is supplied from the battery condition judging unit 3, and a display part 6 for displaying the condition of the battery.

14 Claims, 19 Drawing Sheets

FIG. 15(A)
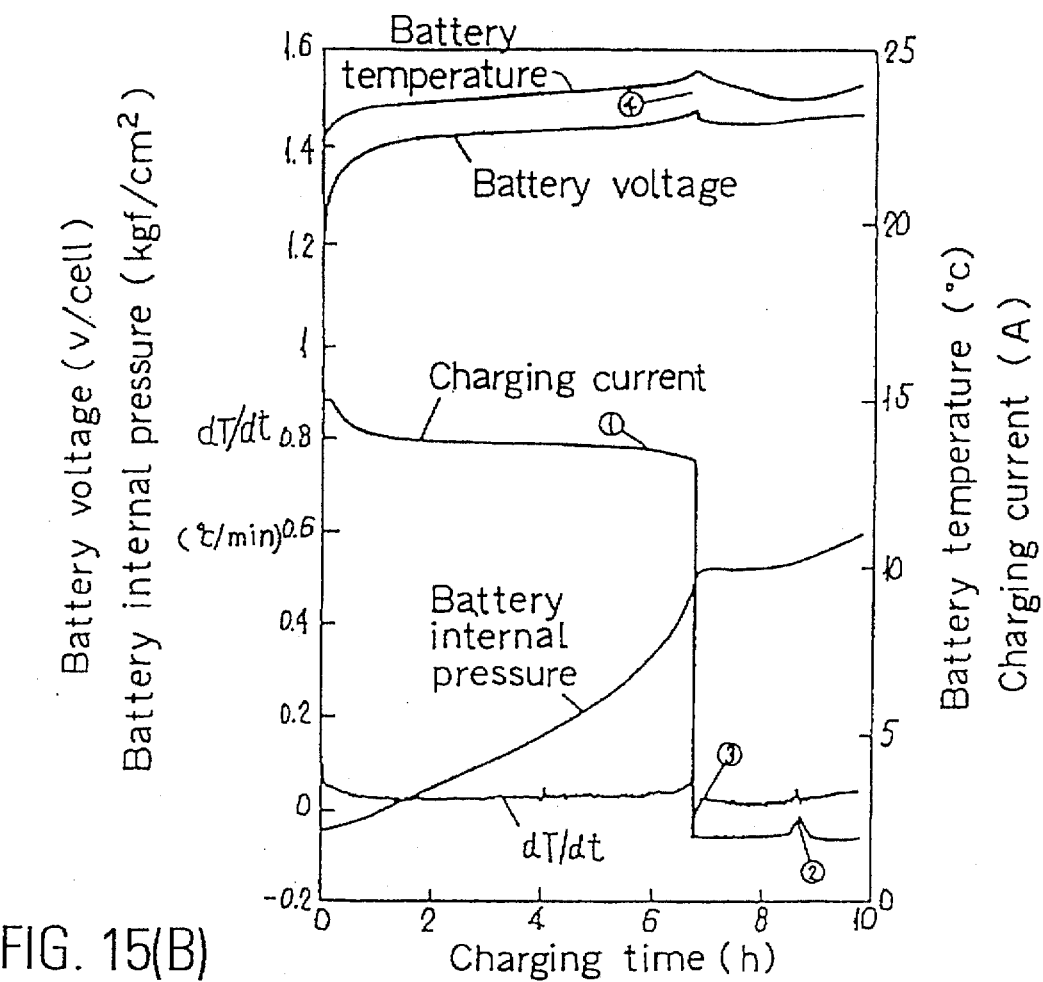
FIG. 15(B)
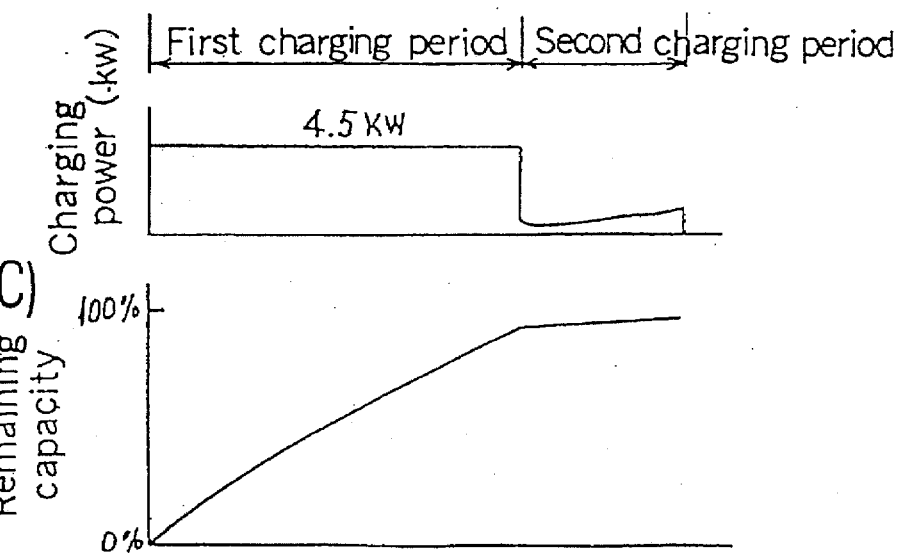
FIG. 15(C)

FIG. 17(A)
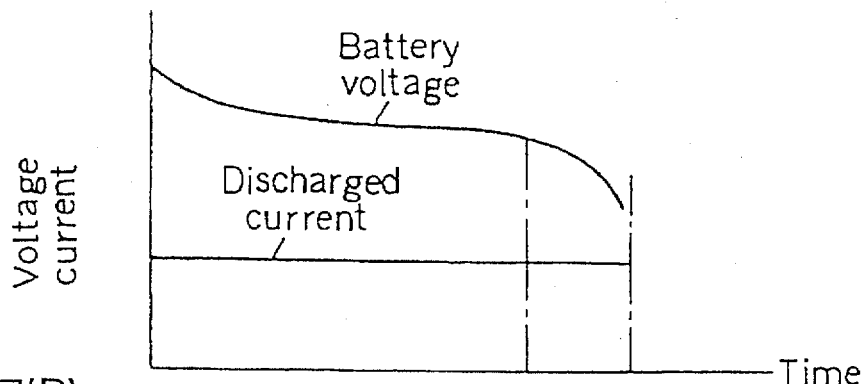
FIG. 17(B)
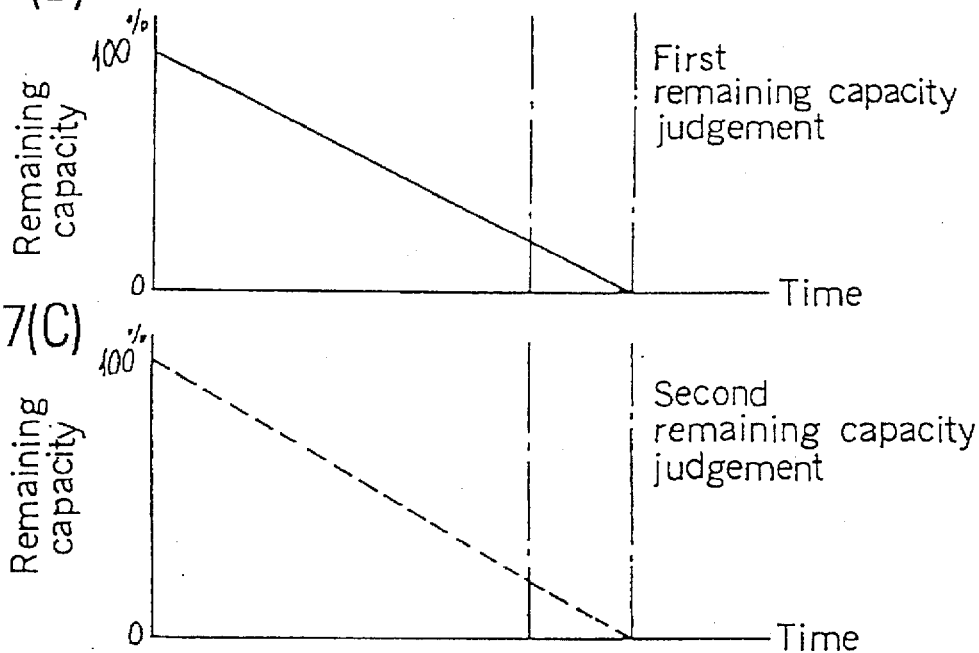
FIG. 17(C)
FIG. 17(D)
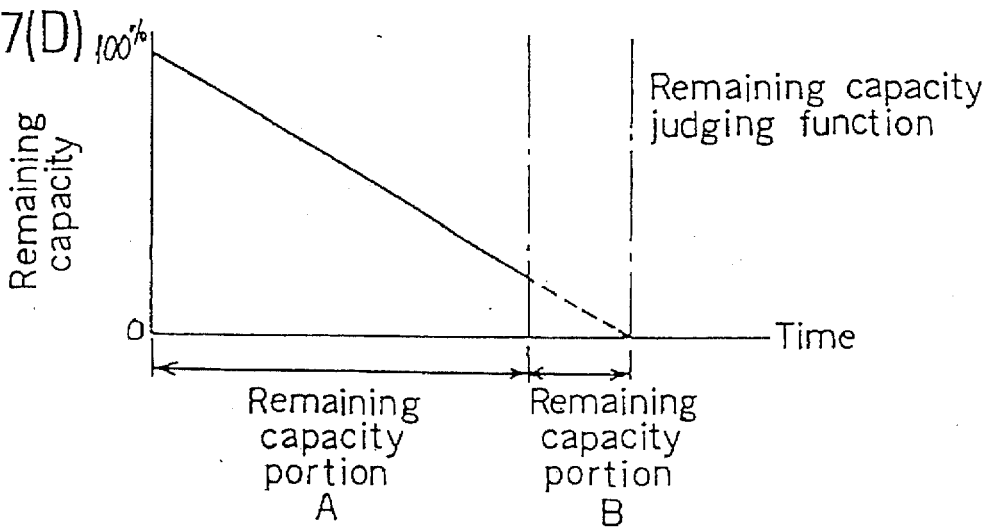

CONDITION MANAGING SYSTEM OF STORAGE BATTERY FOR A MOVABLE BODY

TECHNICAL FIELD

The present invention relates to a condition managing system for managing the condition of a battery pack which is formed by combining a number of storage batteries, such as nickel/hydrogen storage batteries, which may be used as a drive power source for a movable body such as an electric car.

BACKGROUND ART

A sealed nickel/hydrogen storage battery has excellent basic characteristics, such as an energy density, an output characteristic and a cycle life characteristic; and it is under development for a practical use, as a power source for a drive motor or the like for a movable body such as an electric car. In the case of using such a battery to power electric car, the battery must have a battery capacity of about 50 to 150 Ah and a total voltage of about 100 to 350V to supply a predetermined drive output.

Since an output voltage of one cell, i.e., the minimum unit of a sealed nickel/hydrogen storage battery is around 1.2V, a number of cells are connected in series to obtain a desireable total voltage.

If ten such cells are connected in series to form one module battery, and if twenty-four such module batteries are connected in series, a battery pack consisting of two hundred and forty cells is formed so as to produce a total voltage of 288V.

In a movable body such as an electric car which mounts such a battery pack thereon for supplying power to a motor or the like from the battery pack so that the car runs always in a stable condition, the condition of the battery must be managed.

A lead battery is conventionally used in most cases as a power source for a drive motor or the like for a movable body such as an electric car. Condition monitoring of the capability of a battery pack which is formed by lead batteries is realized principally by monitoring a terminal voltage of the battery. For example, a voltage between a plus terminal and a minus terminal of the battery pack as a whole, namely, a total voltage is measured; and the battery pack voltage is controlled and a discharging voltage and a stop voltage are monitored by a constant voltage charging method.

Further, for safe control of the battery, a method of monitoring an absolute temperature of the battery has been proposed.

However, a sealed nickel/hydrogen storage battery which is used as a power source for a drive motor or the like for a movable body such as an electric car has a battery characteristic which is different from that of a conventional battery such as a lead battery; and therefore, with constant voltage control it is difficult to fully utilize the characteristics of the battery.

DISCLOSURE OF THE INVENTION

An object of the present invention is to provide for a condition managing system for a sealed nickel/hydrogen storage battery, with which it is possible to fully utilize the characteristics of a sealed nickel/hydrogen storage battery which has excellent basic characteristics, such as an energy density, an output characteristic and a cycle life characteristic.

In the present invention, a condition managing system for a storage battery used as a drive power source for a movable body comprises:

a battery pack which is formed by combining a number of storage batteries;

a ventilation part for supplying cool air toward said battery pack;

a detection unit which is disposed in the vicinity of said battery pack to detect condition information about a voltage, a temperature and a pressure of a storage battery and an ambient temperature, said detection unit having an analog-digital conversion function of converting an obtained detection value from an analog value into a digital value and a signal sending function of successively sending said digital value in a serial method;

a movable body signal control part for controlling a discharging current of a storage battery, a charging current of the storage battery, a regenerative current to the storage battery which is generated during a breaking operation of the movable body, and various types of information regarding the movable body;

a battery condition judging unit including a computation part for executing computations based on information from said detection unit and the movable body signal control part, a charging control signal part for supplying a charging control signal to a battery charger whose input source is an alternate current power source, a remaining capacity judging signal part for supplying a capacity judging signal to a display part, a lifetime judging signal part for supplying a lifetime judging signal to the display part, and a movable body control signal part for supplying a movable body control signal to said movable body signal control part;

the battery charger for charging said battery pack, under the control of the charging control signal from said battery condition judging unit; and the display part for displaying a remaining capacity of the battery and a result of lifetime judgment, under the control of the capacity judging signal and the lifetime judging signal from the battery condition judging unit.

In the condition managing system: a ventilation unit uniformly cools cells which form said battery pack, a detection unit is disposed near said battery pack to detect battery condition information such as a battery voltage, a battery temperature, a battery pressure and an ambient temperature, and to supply the information to a battery condition judging unit, a movable body signal control part provides the battery condition judging unit with a discharging current and a charging current of a battery, a regenerative current to the battery which is generated during a breaking operation of the movable body, and various types of information regarding the movable body, a battery charger charges up said battery pack, under the control of a charging control signal which is provided to the battery condition judging unit, and said display part displays a remaining capacity of the battery and a result of a lifetime judgment, and therefore, when the display part is disposed on a portion of the movable body, e.g., a dash board which is located in front of a driver's seat, a driver can easily perform maintenance of the battery pack, such as charging while visually confirming the condition of the system as a whole.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIGS. 15(A), (B) and (C) show characteristics of a cell during charging;

FIG. 17(A) shows a battery voltage characteristic during discharging of a battery with a constant current, FIG. 17(B) shows a judgment characteristic which is found by a first remaining capacity judgment, FIG. 17(C) shows a judgment characteristic which is found by a second remaining capacity judgment, FIG. 17(D) shows a remaining capacity judging characteristic in the present embodiment;

It will be recognized that some or all of the Figures are schematic representations for purposes of illustration and do not necessarily depict the actual relative sizes or locations of the elements shown.

DETAILED DESCRIPTION OF THE INVENTION

In the following, a preferred embodiment of the present invention will be described with reference to the accompanied drawings.

Figure 1:
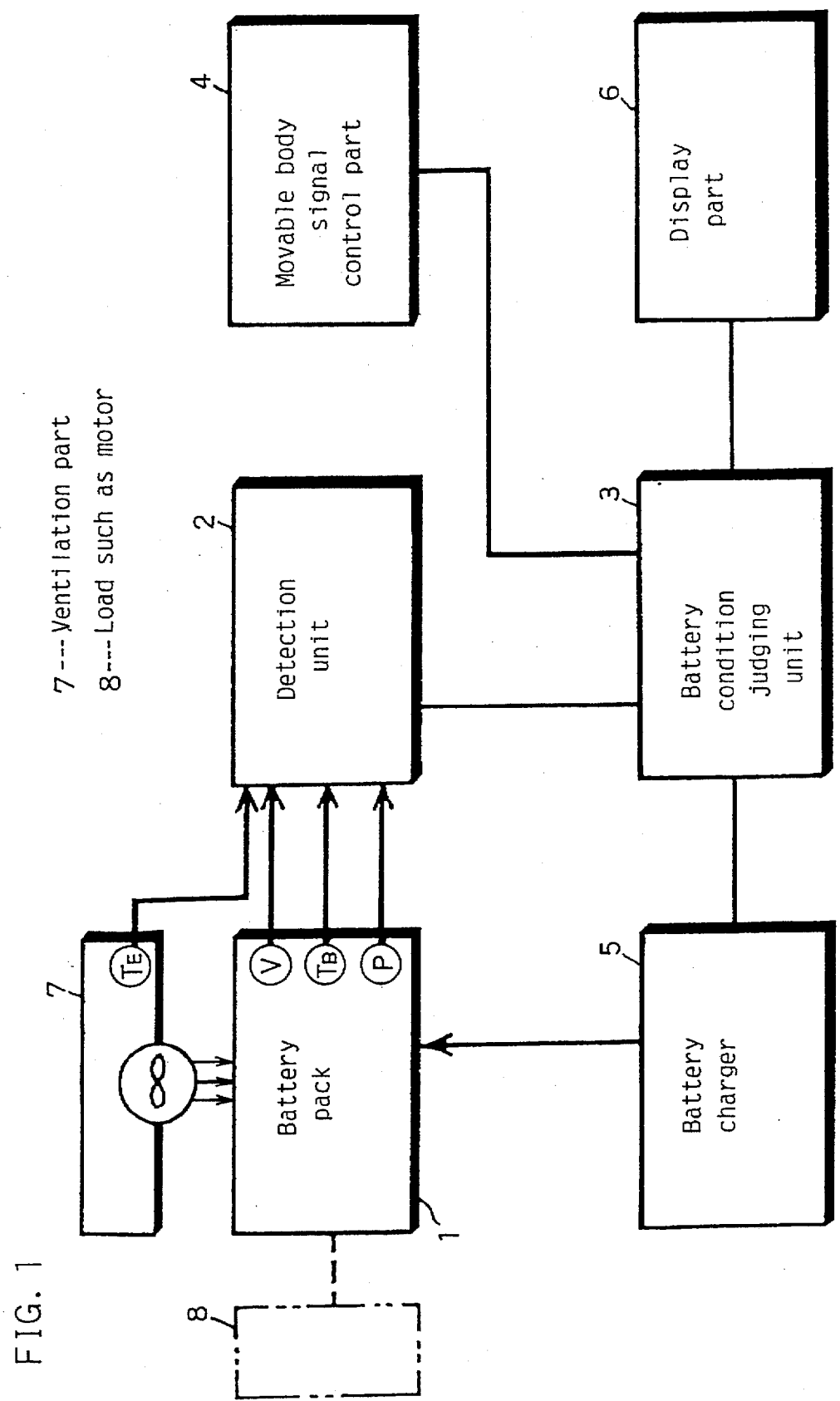
FIG. 1 is a block diagram showing a condition managing system for a storage battery according to a preferred embodiment of the present invention.

FIG. 1 is a block diagram showing a system according to a preferred embodiment of the present invention. All apparatus shown in FIG. 1 are mounted in a movable body such as an electric car. In FIG. 1, a detection unit 2 is connected to a battery pack 1 so as to detect battery condition information such as a battery voltage V, a battery temperature TB, an ambient temperature TE, and a battery pressure P.

The detection unit 2, a movable body signal control part 4, a battery charger 5 and a display part 6 are each connected to a battery condition judging unit 3. The movable body signal control part 4 controls a discharging current of a battery, a charging current of the battery, a regenerative current to the battery which is generated during a braking operation of the movable body, and various types of information regarding the movable body. The battery charger 5 using an alternate current power source as an input supplies a charging current to the battery pack 1, under the control of a charging control signal which is received from the battery condition judging unit 3. The display part 6 displays a condition of the battery, in accordance with a signal which is received from the battery condition judging unit 3.

The battery charger 5 is connected to the battery pack 1, and supplies a charging current to the battery pack 1 under the control of the charging control signal which is received from the battery condition judging unit 3. To realize a uniform temperature over the battery pack 1, the battery pack 1 is cooled by cool air which is supplied from a ventilation part 7. The battery pack 1 is connected to a load 8 such as a motor, in order to supply power to the load.

Figure 2:
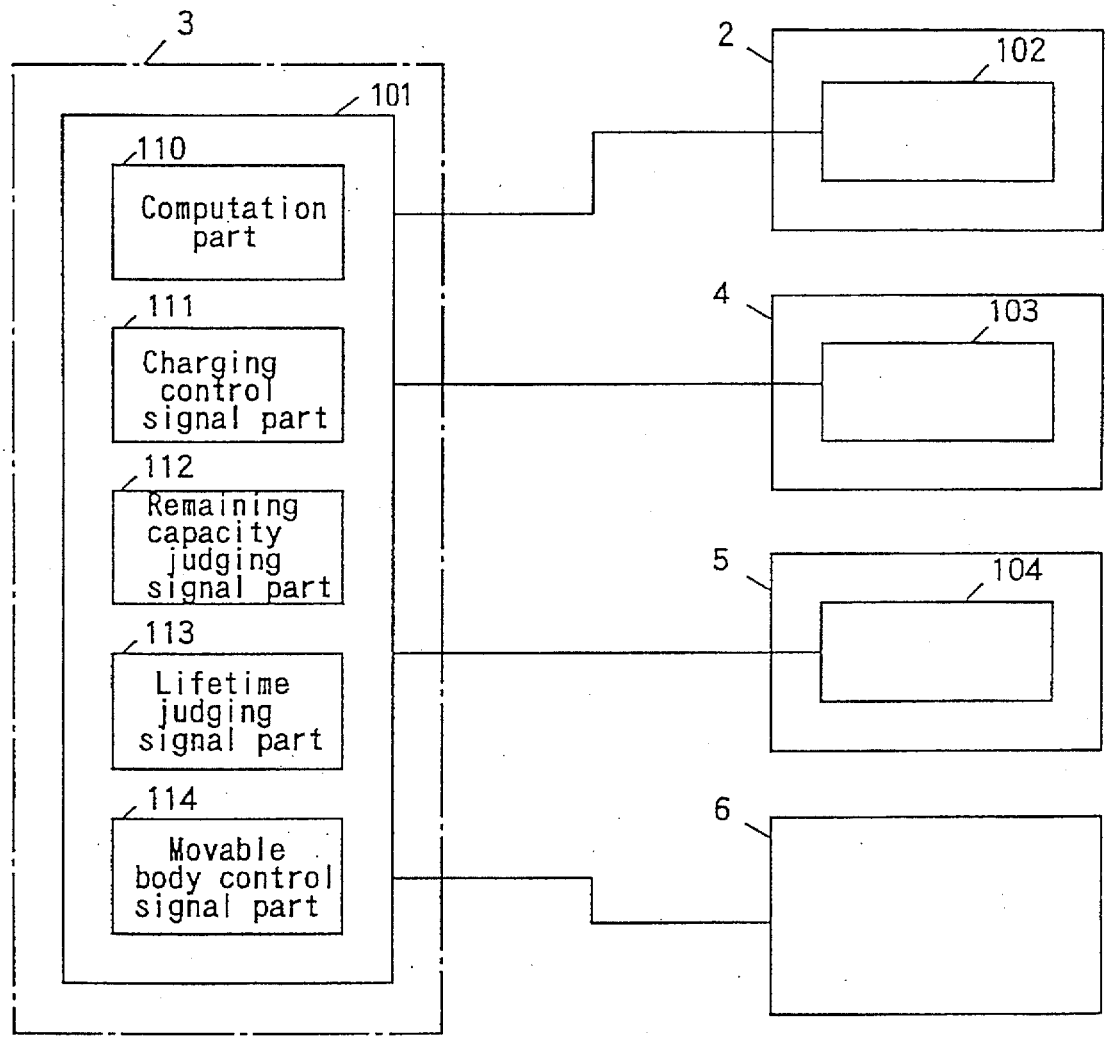
FIG. 2 is a block diagram showing a structure of a battery condition judging unit and connection between the battery condition judging unit and associated apparatuses in the preferred embodiment.

FIG. 2 is a view showing a structure of the battery condition judging unit 3 according to the present embodiment.

The battery condition judging unit 3 comprises a central processing unit (CPU) 101, the detection unit 2 comprises a CPU 102, the movable body signal control part 4 comprises a CPU 103, and the battery charger 5 comprises a CPU 104.

The battery condition judging unit 3 comprises a computation part 110 for executing computations based on information supplied from the detection unit 2 and the movable body signal control part 4, a charging control signal part 111 for supplying the charging control signal to the battery charger 5, a remaining capacity judging signal part 112 for supplying a capacity judging signal to the display part 6, a lifetime judging signal part 113 for supplying a lifetime judging signal to the display part 6, and a movable body control signal part 114 for supplying a movable body control signal to the movable body signal control part 4.

The battery condition judging unit 3, the detection unit 2, the movable body signal control part 4, the battery charger 5 and the display part 6 are connected to each other by a group of signal lines on which a serial signal, a digital signal, an analog signal and the like are supplied, so as to exchange information and control information with each other.

Figure 3:
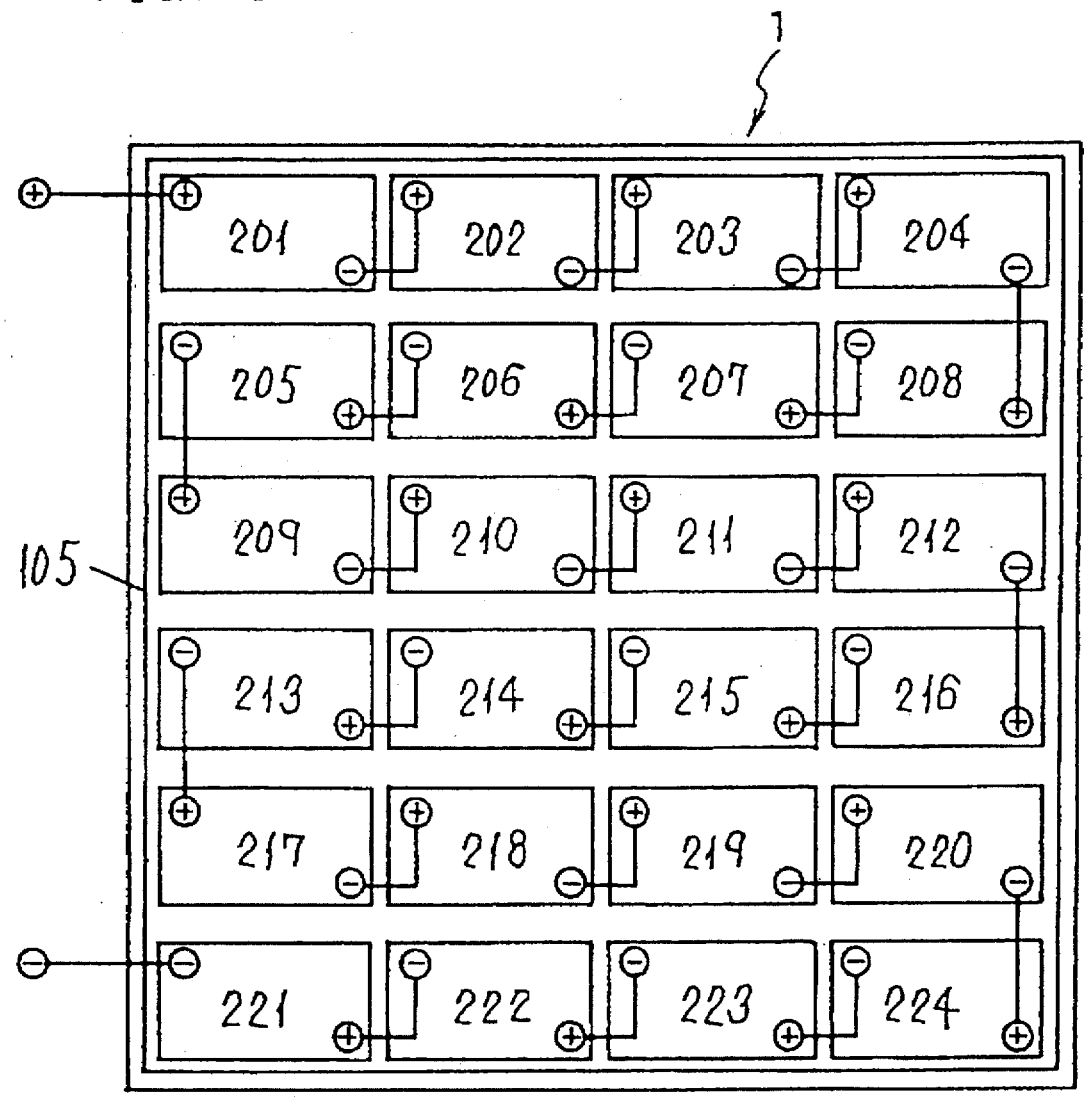
FIG. 3 is a view showing a structure of a battery pack.

FIG. 3 is a view showing a structure of the storage battery 1. The storage battery 1 is formed by connecting in series twenty-four module batteries 201 to 224, each comprising ten cells 401 to 410, connected in series to each other, as will be described with reference to FIG. 4. These module batteries are all contained and fixed in a battery support 105.

Figure 5:
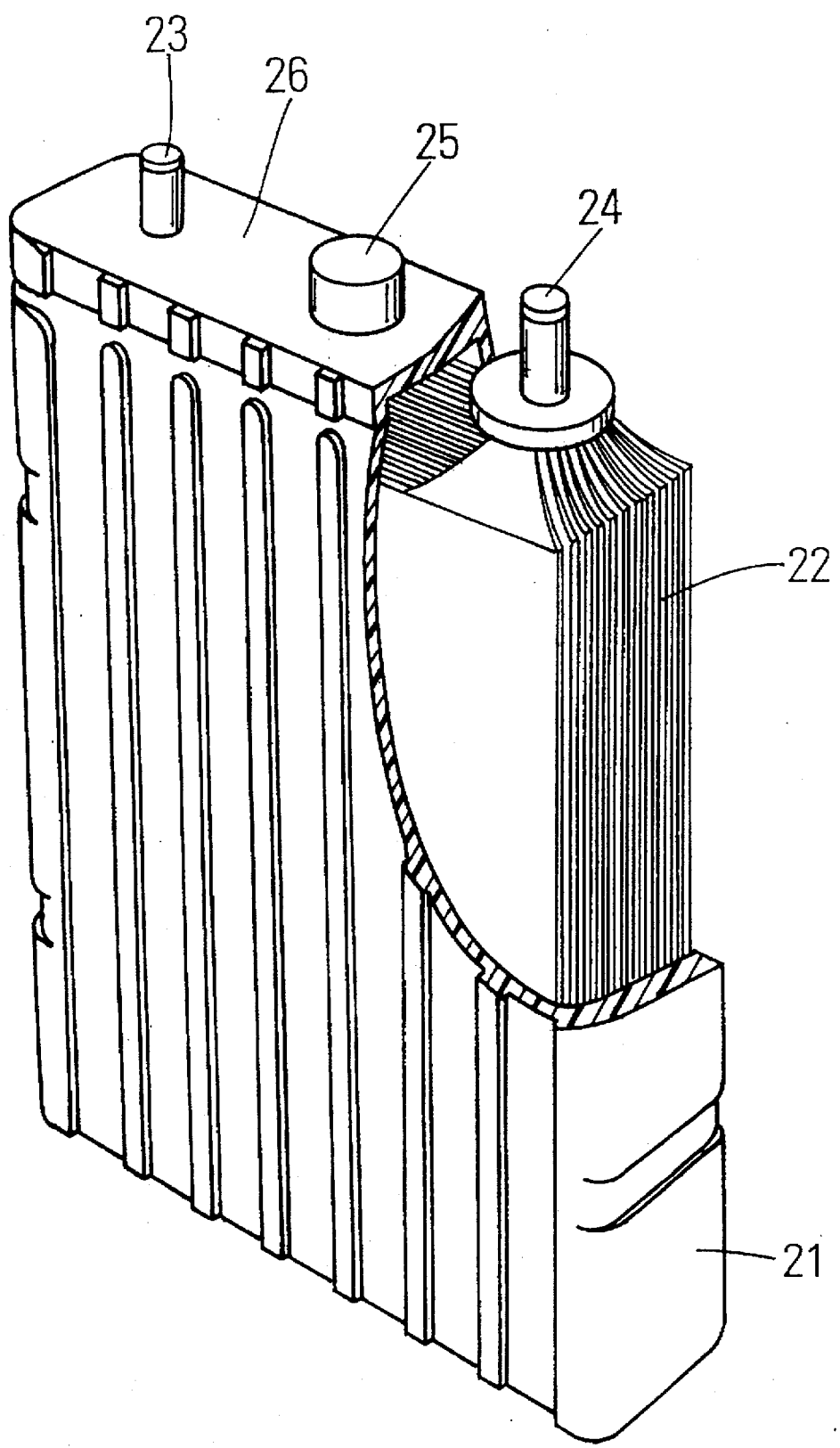
FIG. 5 is a view showing a structure of a sealed nickel/hydrogen storage battery cell.

Hence, the storage battery 1 is formed by connecting in series two hundred and forty cells which are shown in FIG. 5, and the total battery voltage of the storage battery is 288V. The storage battery 1 is attached to an under surface of the movable body or a back portion of a seat, so as to be used as a power source for a load such as a motor.

Figure 4:
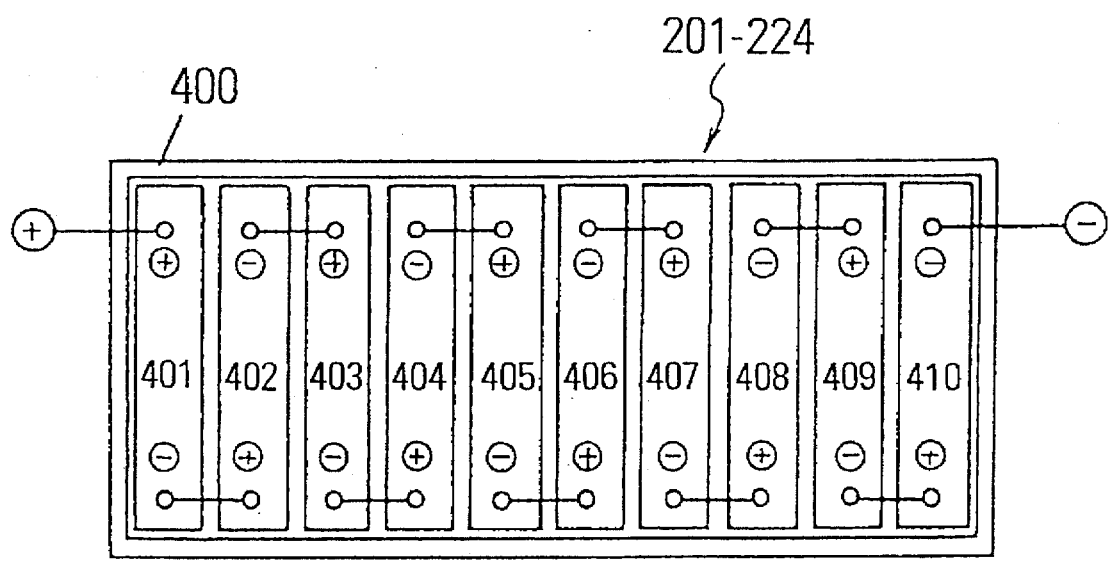
FIG. 4 is a view showing a structure of a module battery.

FIG. 4 is a view showing a structure of a module battery. The module battery is formed by connecting ten unit cells in series and fixed within a module frame 400 which is made of metal; that is, the ten cells are mechanically integrated into one so that the module battery can be easily treated as one battery.

In the present embodiment, since ten cells are connected to each other in series to form one module battery, the total battery voltage of the module battery is 12V.

Instead, the storage battery 1 may be formed by combining module batteries which are formed by a different number of cells, such as nine cells, ten cells and eleven cells, considering a mounting space for mounting the battery.

FIG. 5 is a perspective view showing a structure of a sealed nickel/hydrogen storage battery cell according to the present embodiment. A group of electrodes 22 consisting of a positive polar plate, a negative polar plate and a separator is housed in a battery jar 21, and the positive polar plate is connected to a positive polar terminal 23 and the negative polar plate is connected to a negative polar terminal 24.

In addition to the terminals 23 and 24, a safety valve 25, which opens to discharge gas when a voltage exceeding a certain voltage is applied, is also formed in a lid 26 of the battery jar 21.

In the present embodiment, cells each having a voltage of 1.2V and a capacity of 100 Ah are fabricated and tested.

Figure 6A:
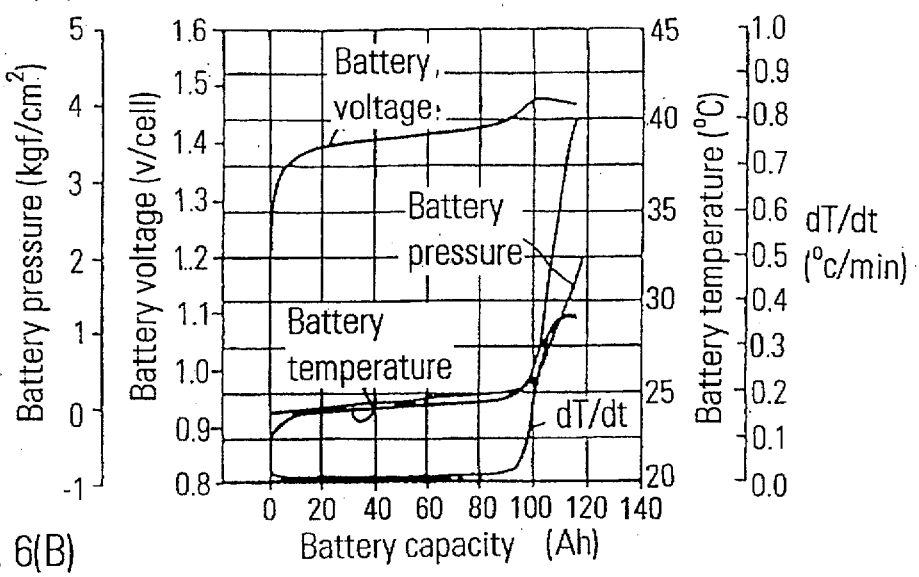
FIG. 6(A) shows a relationship between a battery voltage, a battery temperature, a battery internal pressure and a speed at which a battery temperature increases during charging of a sealed nickel/hydrogen storage battery with a constant charging current of 10A at an ambient temperature of 25° C.

FIG. 6(A) shows a relationship between a battery voltage (V/cell), a battery temperature (°C.), a battery internal pressure (kgf/cm$_2$) and a speed per minute (dT/dt) at which a battery temperature increases during charging of the sealed nickel/hydrogen storage battery cell with a constant charging current of 10A and at an ambient temperature of 25° C.

Figure 6B:
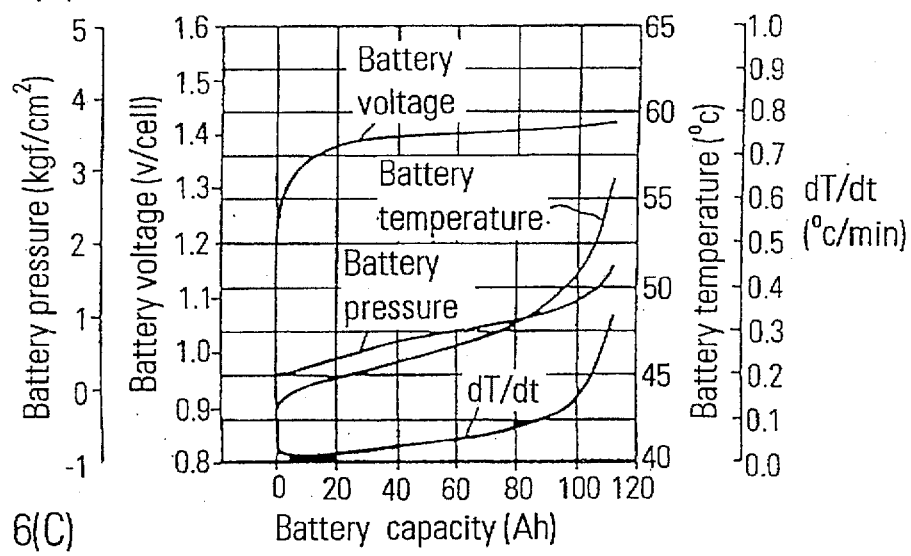
FIG. 6(B) shower a relationship during charging of the same cell under the same conditions but at an ambient temperature of 45° C.

FIG. 6(B) shows a similar relationship during charging up of the sealed nickel/hydrogen storage battery cell with a constant charging current of 10A and at an ambient temperature of 45° C.

Figure 6C:
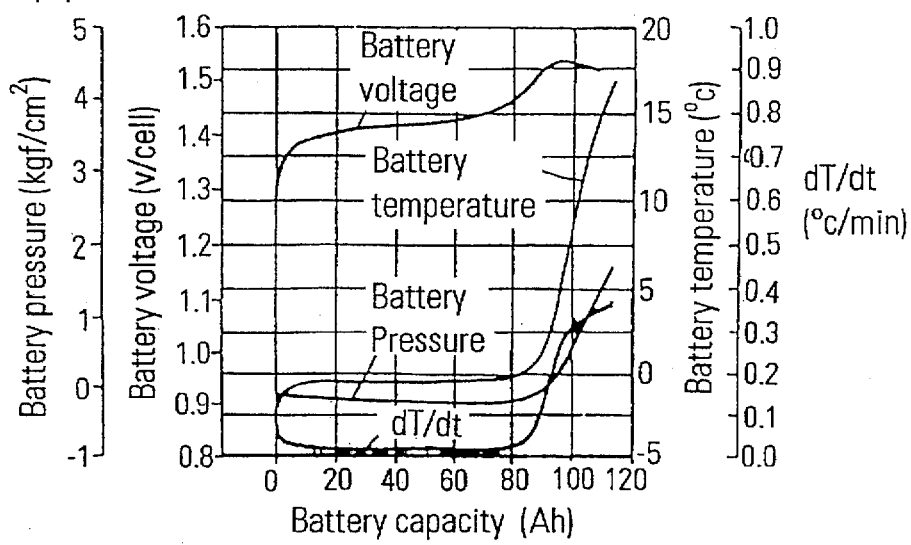
FIG. 6(C) shower a relationship during charging up of the same cell under the same conditions but at an ambient temperature of 0° C.

FIG. 6(C) shows a similar relationship during charging up of the sealed nickel/hydrogen storage battery cell with a constant charging current of 10A and at an ambient temperature of 0° C.

Now, characteristics of the battery will be described with reference to FIGS. 6(A)–(C).

A voltage characteristic at 25° C. shown in FIG. 6(A) rapidly increases at the beginning of charging and thereafter slowly increases. After completion of charging, the characteristic shows that the voltage becomes smaller than the peak value. However, the characteristic at 45° C. shown in the FIG. 6(B) does not easily reach a voltage peak. Further, an overcharge quantity tends to increase.

A temperature characteristic at 0° C. shown in FIG. 6(C) gradually increases upon the start of charging but rapidly increases as charging comes to an end.

On the other hand, at 45° C., the temperature increases from an initial stage of charging, showing a different tendency of an increase in the temperature from those which are observed at 25° C. and 0° C.

The battery internal pressure gradually increases both at 25° C. and 0° C., but rapidly increases as charging comes to an end. However, at 45° C., the battery internal pressure starts increasing from an initial stage of charging, exhibiting a larger rate of increase than those which are observed at 25° C. and 0° C.

The temperature increase characteristic gradually increases both at 25° C. and 0° C., but rapidly increases as charging comes to an end. However, at 45° C., the characteristic starts increasing from an initial stage of charging, exhibiting a larger rate of increase than those which are observed at 25° C. and 0° C.

Thus, since the characteristics during charging differs depending on the temperature of the battery, it is necessary to control charging, considering the charging characteristics.

As a method of controlling charging up, a voltage-controlled method has been proposed which notes the battery voltage. However, since the battery voltage changes with progress of battery usage cycles in this voltage-controlled method, this method is not a suitable charge method for a sealed nickel/hydrogen storage battery.

In addition, a temperature-controlled method has been proposed which notes the absolute temperature of a battery. In this method, the temperature of a battery does not quickly follow an ambient temperature and the battery is overcharged when charged again, and therefore, this method is not a suitable charge method for a sealed nickel/hydrogen storage battery, either.

While a temperature-controlled method has been proposed which notes a battery voltage drop characteristic which is created at the end of charging, this method is not a suitable charge method for a sealed nickel/hydrogen storage battery because of too large overcharge quantity.

Still further, although a voltage-controlled method has been proposed which notes the internal pressure of a battery, this method requires an expensive voltage detection apparatus, and therefore, is not economical as a charge method for a sealed nickel/hydrogen storage battery which uses a number of batteries so as to be used for a movable body.

A large current of about 100 to 300A flows from the battery when a drive motor or the like drives. To accurately measure the voltage of the battery, it is important to reduce an influence of this current. To this end, conventionally, a washer connected to a current line and a voltage line is inserted in a polar column for the positive polar terminal and the negative polar terminal which are located on a top portion of a selected cell, and is fastened from above by a nut.

In such a structure, since the voltage line detects a battery voltage, including a potential difference due to a contact resistance between the polar column and the washer, it is impossible to accurately measure the battery voltage.

Figure 7:
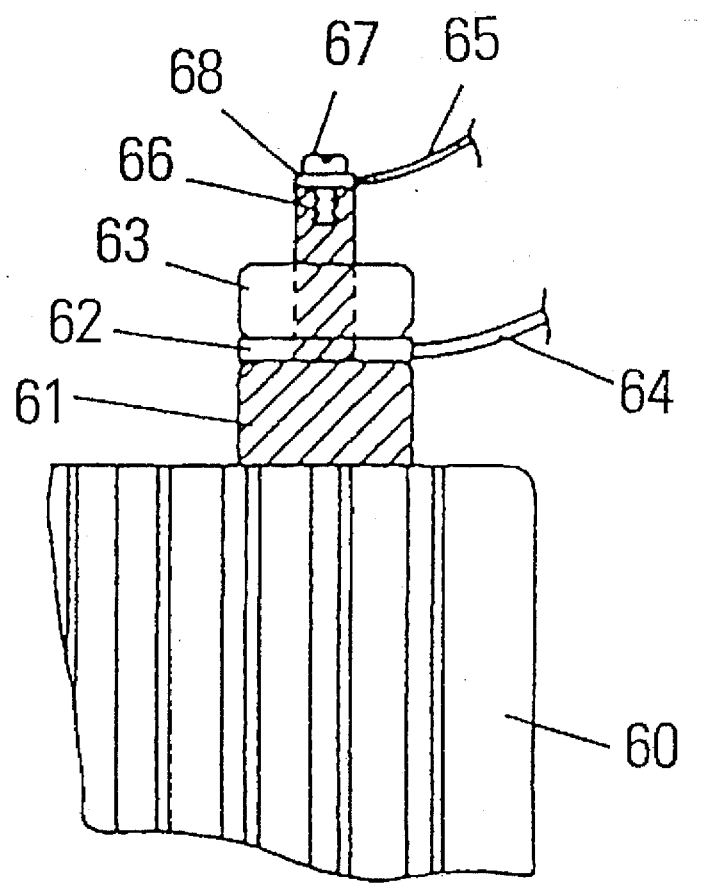
FIG. 7 is a view showing mounting of a voltage detection line to a polar column.

FIG. 7 is a view showing a fixing part for the current line and the voltage line in the present embodiment.

In the present embodiment, a threaded opening 66 for fixing the voltage line is formed in a top portion of a polar column 61 for the positive polar terminal 23 (See FIG. 5) and the negative polar terminal 24 (See FIG. 5) which are located on a top portion of a cell 60. The voltage line 65 is fixed to the polar column 61 by screwing a screw 67 to the threaded opening 66 with a washer 68 which is formed at an end of the voltage line 65 interposed.

The current line 64 is connected in a conventional manner to the polar column 61 by fastening a washer 62 which is formed at an end of the current line 64 around the polar column 61, using a nut 63.

In such a structure, since the voltage line 65 is located on the top portion of the polar column 61 and detects without detecting a potential difference due to a contact resistance between the polar column 61 and the washer 62, it is possible to accurately measure the battery voltage. In addition, since there is no influence due to rust of the washer 62, it is possible to accurately detect the battery voltage over a long term.

Figure 8:
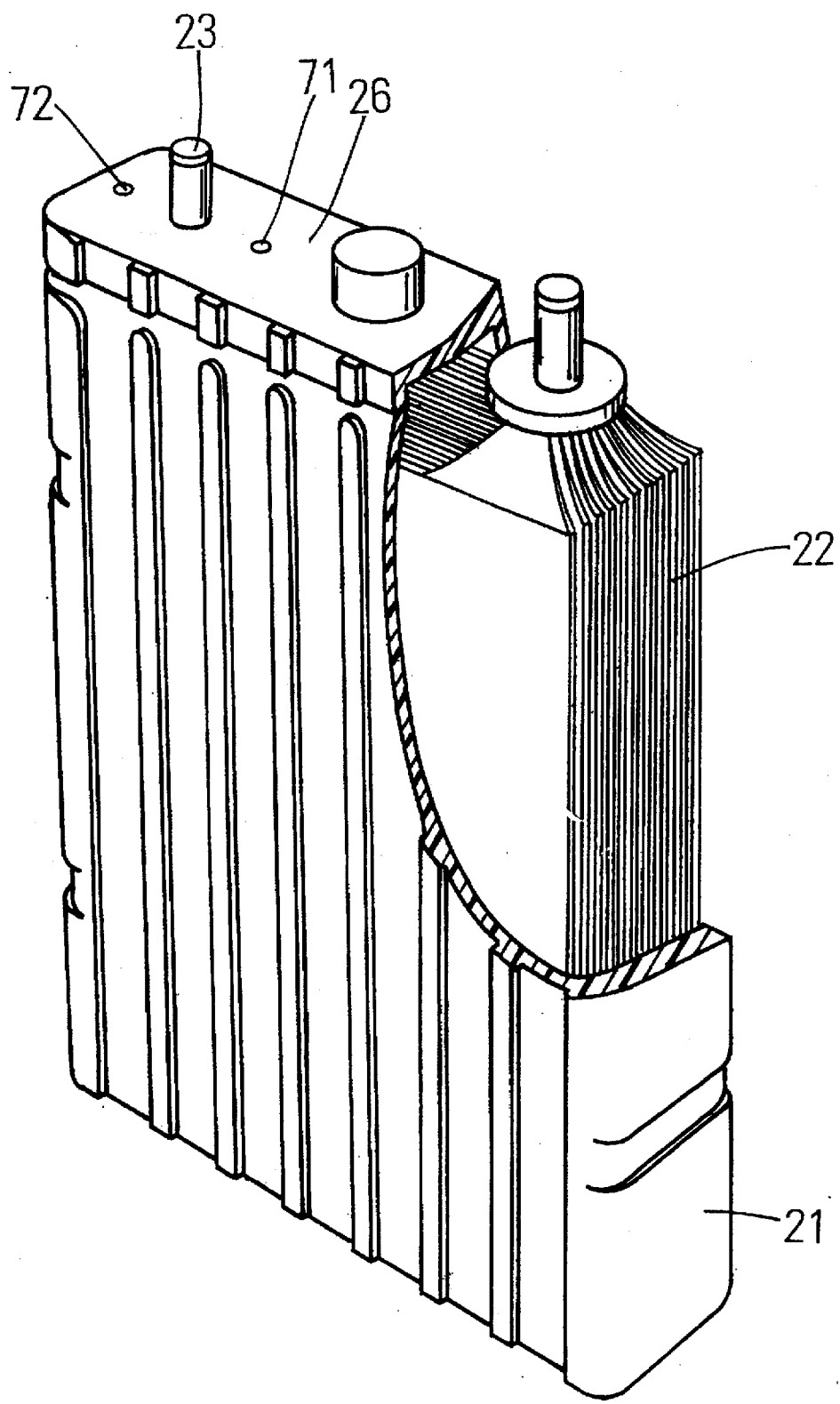
FIG. 8 is a perspective view showing a battery jar lid of a cell to which a temperature sensor is attached.

FIG. 8 is a perspective view showing a cell in which a temperature sensor insertion hole 71 and a voltage-current conversion apparatus mounting hole 72 are formed in a lid.

Figure 9:
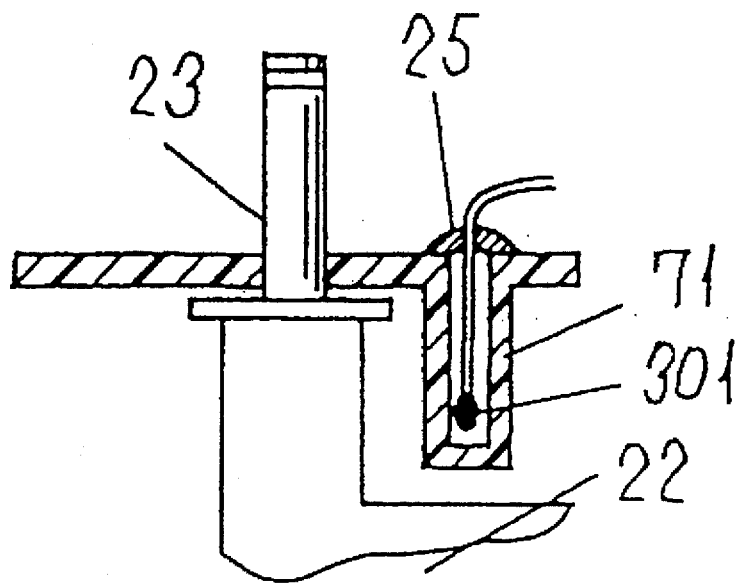
FIG. 9 is a partial cross sectional view of the temperature sensor as it is attached to the battery jar lid.

FIG. 9 is a cross sectional view showing a state in which a temperature sensor is inserted in the temperature sensor insertion hole.

A temperature sensor is conventionally fixed to an exterior portion of a battery by an adhesive agent. Because of this, the temperature sensor is susceptible to an influence of an ambient temperature surrounding the battery, wind, etc., and therefore, it is difficult accurately measure the temperature of the battery.

In the present embodiment, the temperature sensor insertion hole 71 which is deep enough to almost reach a top surface of the group of electrodes 22 is formed in the lid 26 of the battery jar 21. A temperature sensor 301 is inserted in the temperature sensor insertion hole 71 and is fixed by an adhesive agent 25 (See FIG. 9) which also seals the insertion hole.

In such a structure, air around the cell does not enter the temperature sensor insertion hole 71, and therefore, the temperature sensor 301 is not susceptible to an influence of the ambient temperature, wind, etc. Since a bottom portion of the temperature sensor insertion hole 71 is close to the top surface of the group of electrodes 22, it is possible to measure a temperature which is almost the same as the internal temperature of the battery and hence it is possible to obtain correct information regarding the internal battery temperature.

At the same time, it is possible to prevent the temperature sensor from getting detached from the cell container.

Figure 10:
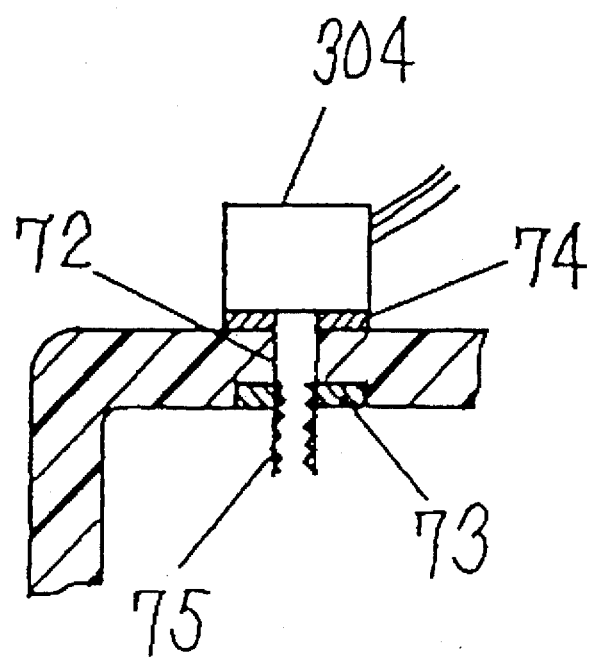
FIG. 10 is a partial cross sectional view of a voltage/current conversion apparatus as it is attached to the battery jar lid.

FIG. 10 is a view showing the voltage-current conversion apparatus mounting hole and a state in which a voltage-current conversion apparatus is mounted in the present embodiment.

The voltage-current conversion apparatus used in this example is formed using a semiconductor pressure sensor; and a "Pressure Transmitter" (hereinafter "pressure transmitter") which is manufactured and sold by Nagano Seisakusho. This voltage-current conversion apparatus is structured in a small size, utilizing a change in a resistance value due to a distortion of a semiconductor created by pressure.

In the present embodiment, as shown in FIGS. 8 and 10, a pressure transmitter mounting insertion hole 72 is formed in the lid 26 of the battery jar 21 of a cell, and the pressure transmitter 304 is fixed to an inner surface of the battery jar 21 by a nut 73.

The pressure transmitter 304 is structured to have a screw 75 in an insertion portion so that the pressure transmitter 304 is fixed to the lid 26 of the battery jar 21 by the nut 73, with a rubber ring 74 placed under the pressure transmitter 304.

In such a structure, the battery is maintained air-tight and pressure inside the battery can be accurately detected, and therefore correct information regarding the pressure inside the battery can be obtained.

Figure 11:
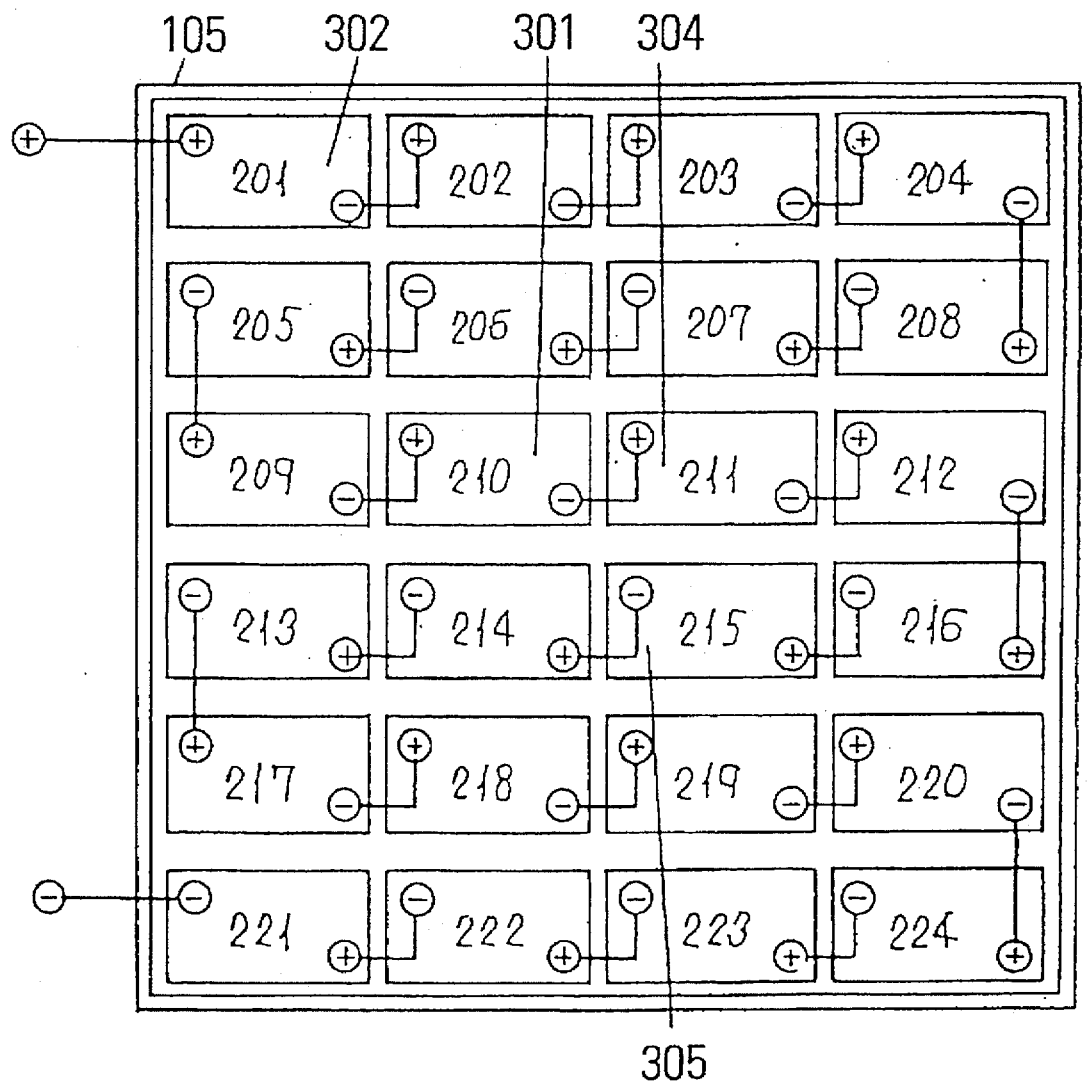
FIG. 11 is a view showing a relationship between mounting positions of a battery pack, the temperature sensor and the pressure transmitter.

FIG. 11 is a view showing a state in which the temperature sensor and the pressure transmitter are attached to the battery pack in the present embodiment.

A temperature sensor 301 is attached to one of cells the disposed within a module battery 210, while a temperature sensor 302 is attached to one of the cells disposed within a module battery 201.

The module battery 210 is located near the center of the battery pack 1 and four sides of the module battery 210 are surrounded by other module batteries; and therefore, the module battery 210 is susceptible to an influence of heat generated by the surrounding module batteries during charging and discharging and heat is built up in the module battery 210. On the other hand, the module battery 201 is located at a peripheral portion of the battery pack 1 and only two sides of the module battery 201 are surrounded by other module batteries, and therefore, the module battery 201 is not susceptible to an influence of heat generated by the surrounding module batteries during charging and discharging and heat is not built up in the module battery 201.

The pressure transmitter 304 is attached to one of the cells disposed within a module battery 211, while a pressure transmitter 305 is attached to one of the cells disposed within a module battery 215. The module batteries 211 and 215 are each located near the center of the battery pack 1 and four sides of each module battery 211, 215 are surrounded by other module batteries, and therefore, the module batteries 211 and 215 are each susceptible to an influence of heat generated by the surrounding battery blocks and a voltage of each module battery increases during charging and discharging.

Being structured as described above, the temperature sensor 301 detects a temperature increase at a rapid rate as described earlier with reference to FIG. 5. Further, as described with reference to FIG. 5, the temperature sensor 302 detects a temperature increase at a lower rate.

Hence, when the temperature sensors are disposed at the two positions described above, it is possible to detect a battery temperature change at the end of charging which represents the entire battery pack 1, and hence it is possible to obtain battery temperature information which is necessary to accurately control charging.

Further, in the pressure transmitters 304 and 305, since a battery pressure at a high temperature is detected and a change in the battery pressure at the end of charging which represents the entire battery pack 1 can be detected, it is possible to obtain battery pressure information which is necessary to accurately control charging.

Figure 12:
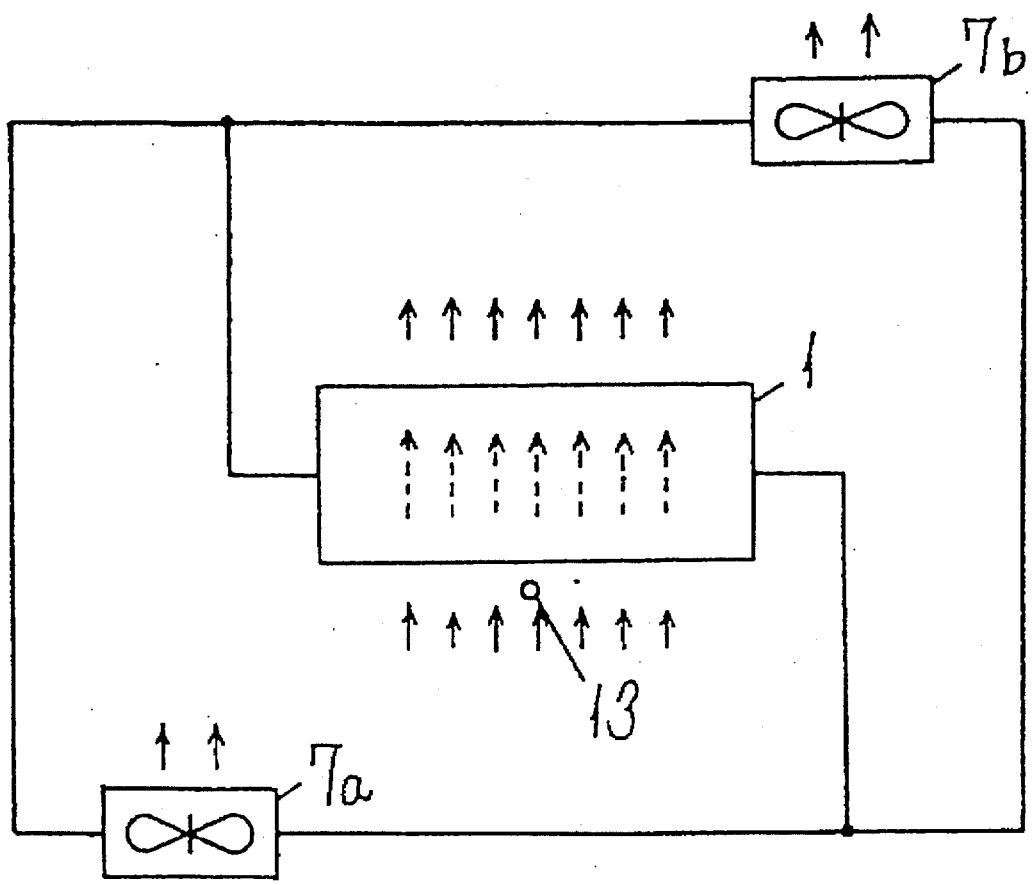
FIG. 12 is a schematic diagram showing a relationship between cooling of a battery by a ventilation part and a mounting condition of the temperature sensor to the battery which detects an ambient temperature.

FIG. 12 is a schematic diagram showing cooling which is realized by cool air supplied from a ventilation fan 7a and a suction fan 7b of the ventilation part 7 of the battery pack 1 (See FIG. 1) and mounting of a temperature sensor 13 for detecting an ambient temperature around the module batteries.

Air flow supplied through an air inlet which is formed in a bottom portion of the battery pack 1 passes around the module batteries and is discharged through an air outlet which is formed in a top portion of the battery pack 1.

The ventilated air flow equalizes the outside temperatures of all batteries module. Further, the temperature sensor 13 which detects an ambient temperature around the batteries module is mounted near the air inlet. Alternatively cool air may be supplied through an air inlet which is formed in a top portion of the battery, flow around the battery unit to cool the module batteries, and be discharged through an air outlet formed in a bottom portion of the battery. Of course, in such a case, the mounting position of the temperature sensor which detects an ambient temperature must be changed to a position near the air inlet which is formed in the top portion of the battery.

In such a structure, it is possible to ensure that the temperatures of the cells which form the battery pack 1 are almost uniform. Further, since the temperature sensor which detects an ambient temperature is mounted near the air inlet, the temperature sensor detects an ambient temperature without being influenced by the temperature of the module batteries, and it is possible to obtain battery ambient temperature information which is necessary to accurately control charging.

Figure 13:
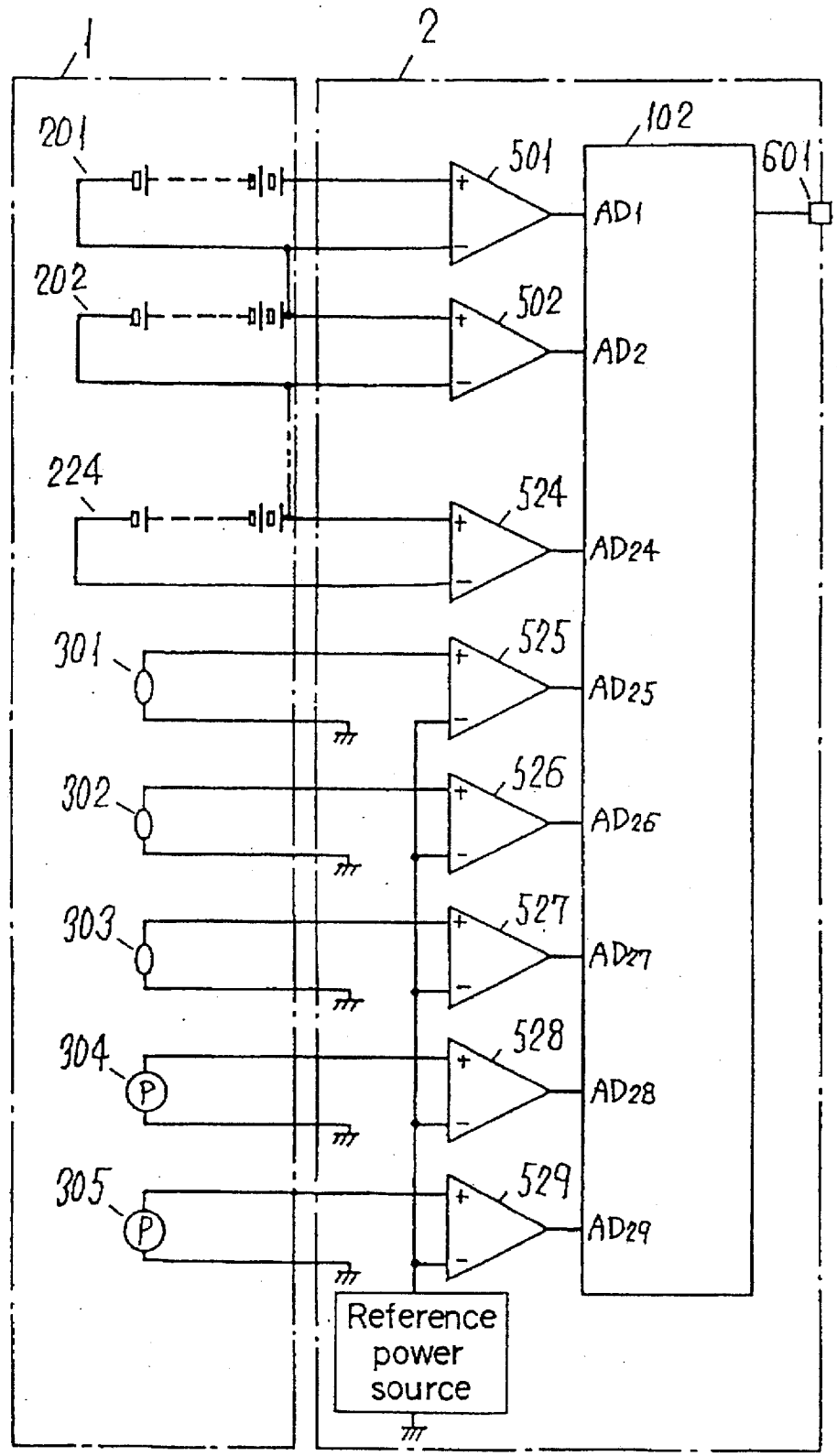
FIG. 13 is a circuitry block diagram showing a relationship between an inner circuit of the detection unit and the battery pack 1 which are shown in FIG. 1.

FIG. 13 is a circuitry block diagram of an internal circuit of the detection unit 2 which is shown in FIG. 1.

In FIG. 13, the detection unit 2 comprises the CPU 102. Voltage detection operational amplifiers 501, 502, . . . 524 are connected between the CPU 102 and end portions of the module batteries 201, 202, . . . 224 of the battery pack 1, respectively.

Further, the temperature sensors 301, 302 and 303 for outputting a voltage in accordance with a temperature are connected to voltage detection operational amplifiers 525, 526 and 527, respectively.

Further, the pressure transmitters 304 and 305 for outputting a voltage in accordance with an internal pressure of the battery are connected to voltage detection operational amplifiers 528 and 529, respectively. The voltage detection operational amplifiers 501 to 529 are connected to analog-digital conversion parts AD1, AD2, . . . AD29 of the CPU 102 for converting an analog value into a digital value, respectively, and the results of the conversions are successively supplied to the battery condition judging unit 3 (FIG. 1) as a serial signal, through a Group of signal terminals 601.

Figure 14:
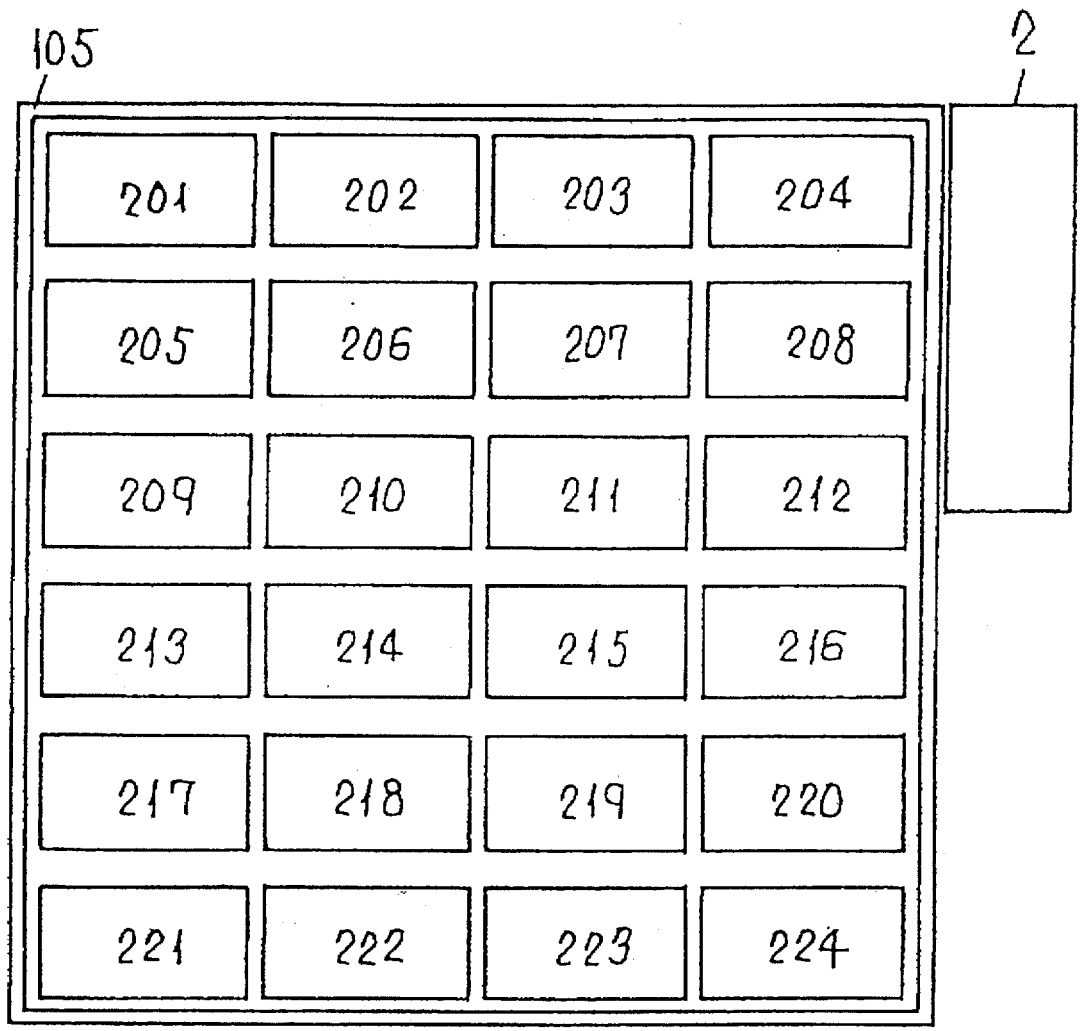
FIG. 14 is a schematic diagram showing an arrangement of the battery pack and the detection unit which are shown in FIG. 1.

FIG. 14 is a schematic diagram showing the battery pack 1 and the detection unit 2 of FIG. 1 as they are attached to each other.

Signal lines for battery information such as a battery voltage, a battery temperature, a battery pressure and an ambient temperature surrounding a battery are conventionally connected to a battery charger or the like directly.

However, in the present embodiment, the detection unit 2 is disposed near the battery support 105 of the battery pack 1. Although not shown in FIG. 13 for simplicity, the detection unit 2 and the battery pack 1 are connected to each other by signal lines for detecting the voltage V, the temperature T and the pressure P, respectively, as shown in FIG. 1.

In such a structure, fifty-eight signal lines necessary if positive signal lines and negative signal lines are independent of each other in order to measure the battery voltage in the twenty-four module batteries, the battery temperature at two positions, the ambient temperature surrounding the battery at one position, and the battery pressure at two positions; whereas, since the detection unit 2 has been disposed near the battery support 105 of the battery pack 1, the wires can be made short and therefore the efficiency of wiring is high.

Figure 16:
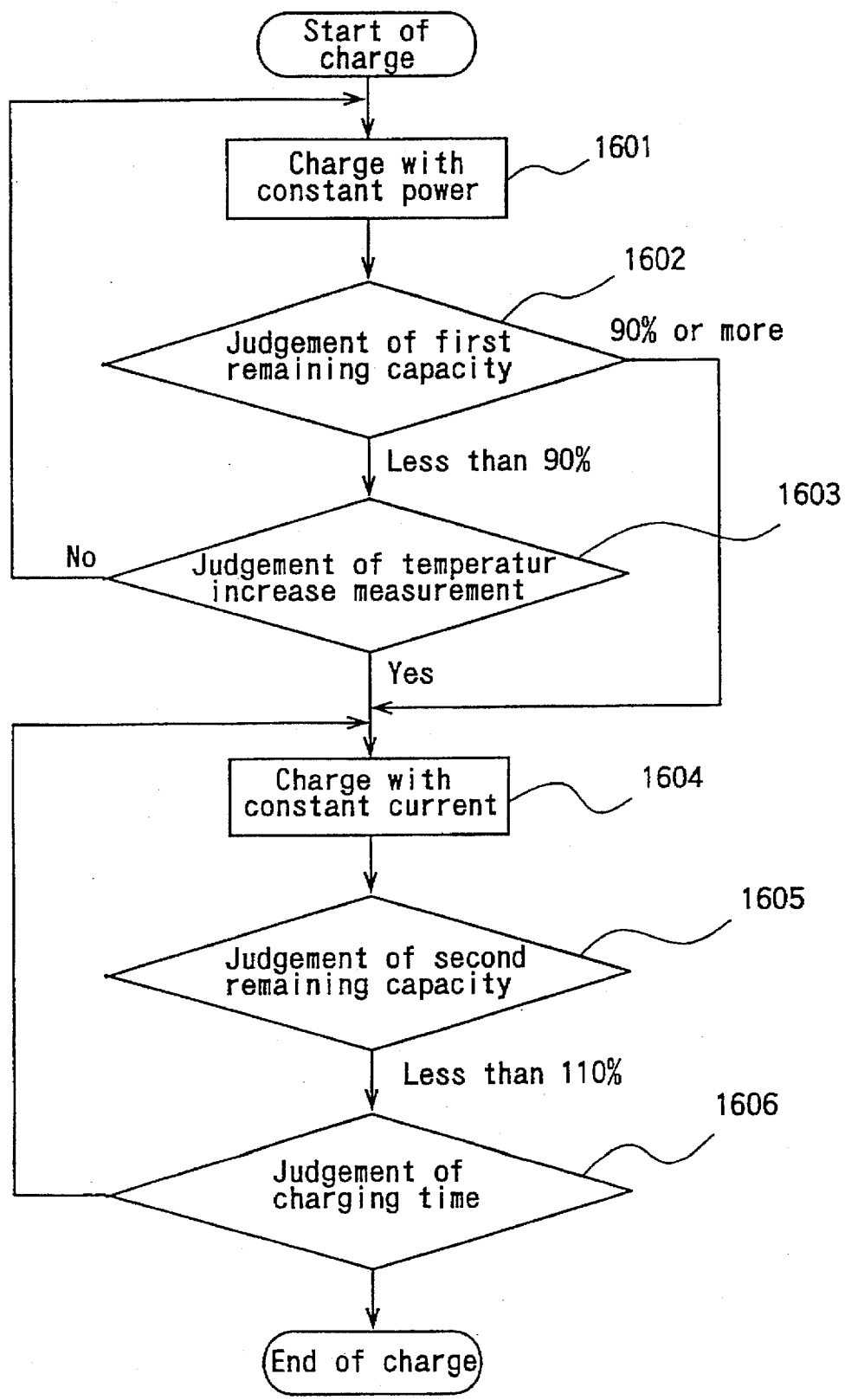
FIG. 16 is a flow chart showing a condition of charging up.

FIGS. 15(A), (B) and (C) show charging performed by the unit cell according to the present embodiment, and FIG. 16 is a flow chart showing a flow of charging according to the present embodiment.

Now, a description will be given on charging in the structure which is shown in FIGS. 1 and 2, while referring to FIGS. 15(A), (B) and (C) and 16.

An experiment confirmed that charging performed by the battery pack 1 has no difference from charging performed by the unit cell, only with a difference that the voltage becomes a multiple of the number of the unit cells which form the battery pack 1. Hence, only charging performed by the unit cell will be described here.

Charging consists of two parts, i.e., a first charging period and a second charging period.

The first charging period starts upon the start of charging. During the first charging period, charging is executed with a large charging current of about 0.1C to 0.2C (about 13A in the present embodiment).

The battery voltage increases as charging progresses. At this stage, the battery charger 5 is controlled by the charging control signal from the battery condition judging unit 3 so that a product of the charging current and the charging voltage, i.e., the charging power stays constant (at 4.5 kW in the present embodiment) (Step 1601).

The first charging period continues while a result of a first remaining capacity judgment is under a predetermined value (under 90% of the initial capacity in the present embodiment) or while a result of judgment of the battery temperature increase rate is under a predetermined value (under 0.2° C./minute in the present embodiment), and it completes when a result of the first remaining capacity judgment reaches the predetermined value or when a result of the judgment of the battery temperature increase rate reaches the predetermined value (Step 1602, Step 1603).

Since said predetermined value of the battery temperature increase rate is corrected based on the charging current and the battery temperature which are set in advance in a memory part of the CPU of the battery condition judging unit 3, it is possible to judge correctly.

During the second charging period, charging is executed with a small charging current of about 0.02C (3A in the present embodiment) (Step 1604). The second charging period continues while a result of a second remaining capacity judgment is under a predetermined value (under 110% of the initial capacity in the present embodiment) or while a time period of the second charging period is shorter than a predetermined value (shorter than three hours in the present embodiment); and it is completed when a result of the second remaining capacity judgment reaches the predetermined value or the time period of the second charging period reaches the predetermined value (Step 1605, Step 1606).

Thus, when charging is executed with a constant power during the first charging period in the present embodiment, it is possible to charge with maximum power which is close to the maximum value of contract power, thereby saving the charging time by about one hour over where charging is executed with a constant current of 13A during the first charging period.

Further, since charging is stopped when the predetermined remaining quantity or the predetermined time is reached during the second charging period, it is possible to efficiently charge without wastefully using the charging power.

FIGS. 17(A), (B), (C) and (D) show a remaining capacity judging function according to the present embodiment.

FIGS. 18(A), (B), (C) and (D) show a judgment of a remaining capacity according to the present embodiment.

FIG. 17(A) shows a battery voltage characteristic during discharging with a constant current. FIG. 17(B) shows a change in a remaining capacity which is yielded by the first remaining capacity judgment in which a remaining capacity of a battery is judged by adding and subtracting a discharged electricity quantity from the battery, a charged electricity quantity to the battery and a self-discharged electricity quantity from the battery.

FIG. 17(C) shows a change in a remaining capacity which is yielded by the first remaining capacity judgment in which a remaining capacity of a battery is judged by correcting the battery voltage during discharging with the discharging current and assuming the battery voltage during application of a constant load. FIG. 17(D) shows a change in a remaining capacity of the battery which is yielded by the remaining capacity judging function according to the present embodiment.

Since a remaining capacity of a battery is conventionally judged from a result of said first remaining capacity judgment or a result of said second remaining capacity judgment, it is impossible to accurately judge the remaining capacity of the battery over the entire period.

In addition, since a remaining capacity of a battery is judged in the first remaining capacity judgment by adding and subtracting the discharged electricity quantity from the battery, the charged electricity quantity to the battery and the self-discharged electricity quantity from the battery, it is difficult to grasp a change in the remaining capacity of the battery which is associated with a memory effect.

It is particularly difficult to display an accurate remaining capacity when the remaining capacity extends from around 20% to around 0%.

On the other hand, since the remaining capacity is judged by correcting the battery voltage during discharging with the discharging current and assuming the battery voltage during application of a constant load, a change in the battery voltage is small particularly when the remaining capacity remains from around 100% to around 20%, and therefore, it is difficult to grasp a change in the remaining capacity of the battery and to display an accurate remaining capacity.

Figure 18:
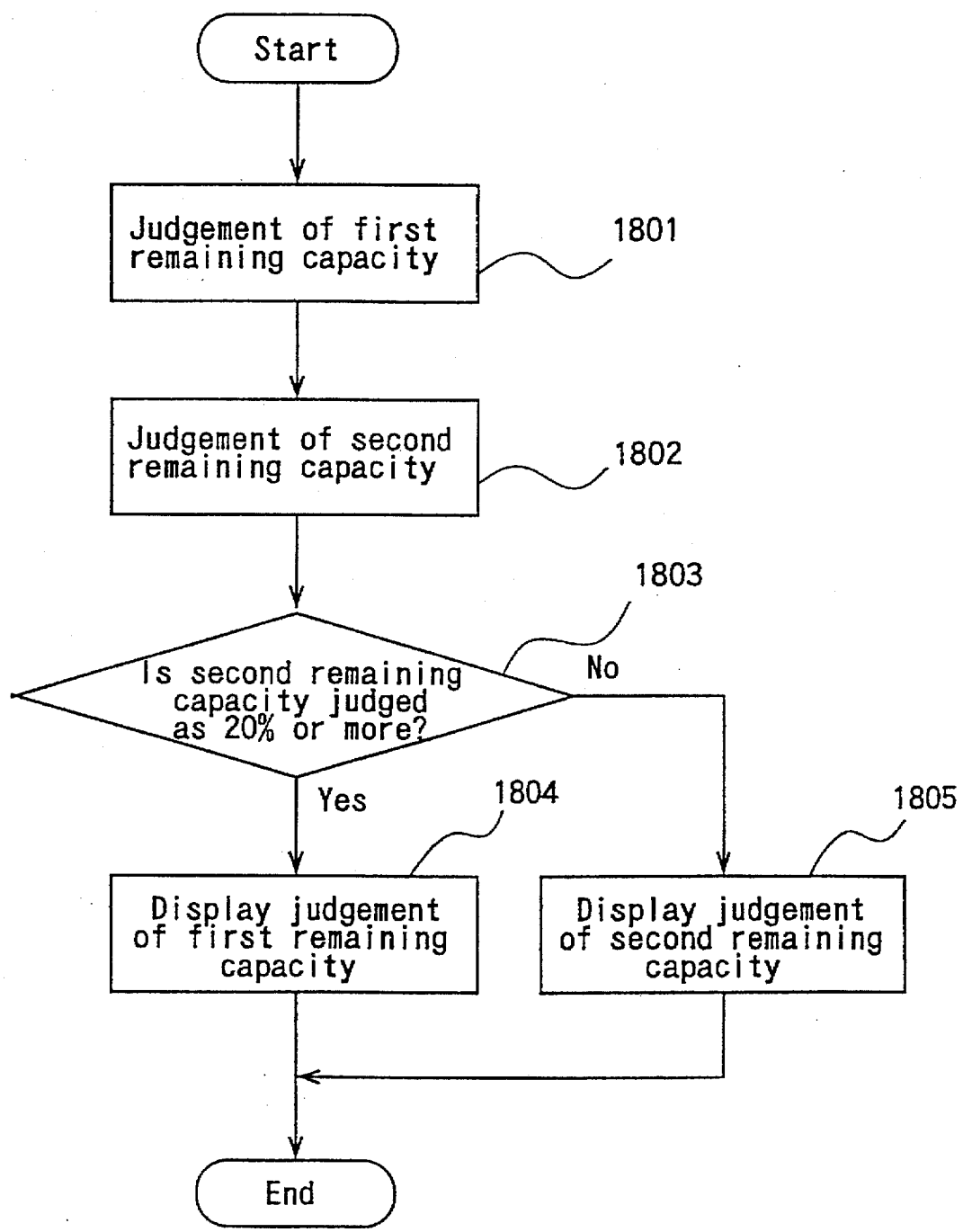
FIG. 18 is a flow chart showing a remaining capacity judging function in the present embodiment.

However, in the present embodiment as shown in FIG. 18, the remaining capacity is judged by the two methods of the first remaining capacity judgment (Step 1801) and the second remaining capacity judgment (Step 1802); the remaining capacity which is yielded by the first remaining capacity judgment is adopted while the remaining capacity remains from around 100% to around 20% of the initial capacity (Step 1803, Step 1804); but the remaining capacity which is yielded by the second remaining capacity judgment is displayed when the remaining capacity according to the first remaining capacity judgment varies from around 20% to around 0% after having dropped to around 20% of the initial capacity (Step 1803, Step 1805).

Thus, according to the present embodiment, by combining the first remaining capacity judgment which is based on the discharged electricity quantity and the second remaining capacity judgment which is based on the discharging voltage, it is possible to judge a remaining capacity at a high accuracy.

Figure 19:
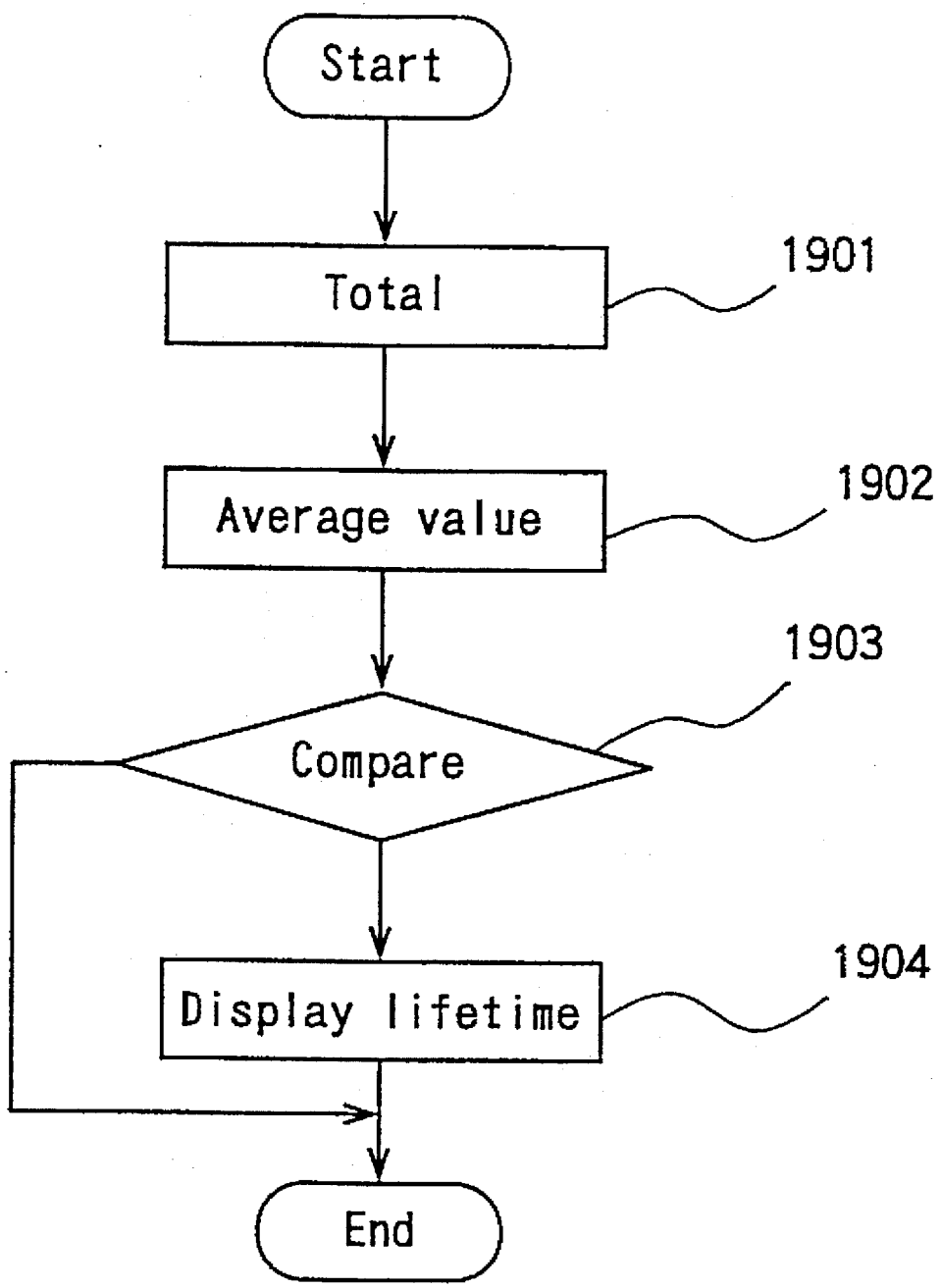
FIG. 19 is a flow chart showing a battery lifetime judging function in the present embodiment.

FIG. 19 is a flow chart showing a lifetime judgment according to the present embodiment.

The battery condition information which is obtained regarding every module battery of the battery pack, namely, the battery voltage and the remaining capacity are added up (Step 1901), and an average value of the total data is then calculated (Step 1902).

The calculated average value is compared with the battery condition information regarding every module battery (Step 1903), and it is judged that there is deterioration if a difference between the two is equal to or larger than a predetermined value.

For example, in the case that the voltage of the module battery to be compared with the average value is different from the average voltage value by about 1V, it is assumed that there is a shorted battery within this module battery and therefore it is determined that the lifetime is reached. Further, in the case that the remaining capacity of the module battery to be compared is different from the average remaining capacity by about 20%, it is assumed that there is a battery with a deteriorated remaining capacity within this module battery and therefore it is determined that the lifetime is reached.

In accordance with a signal from the battery condition judging unit based on such a judgment result, the display part 6 displays the lifetime (Step 1904). When it is judged as a result of comparison that the lifetime is not yet reached, the lifetime is not displayed.

Since the condition is judged based on the battery condition information regarding every module battery in this manner, it is possible to accurately identify a defect such as a shorted battery or a battery with a deteriorated capacity and to identify a battery whose lifetime is reached.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

A condition managing system for a storage battery, which is used as a power source for a drive motor or the like for a movable body such as an electric car in accordance with the present invention comprises a battery pack which is formed by a plurality of module batteries and a ventilation part for supplying cool air toward the battery pack; and in the system, a detection unit which is disposed in the vicinity of the battery pack detects information regarding the storage battery, and charging of a battery charger is controlled properly while a display part accurately displays a remaining capacity and a lifetime of a battery, using a computation function of a battery condition judging unit based on information which is supplied from the detection unit and a movable body signal control part.

Hence, it is possible to grasp and maintain the condition of the storage battery in an easy manner.

We claim:

1. A condition managing system for a storage battery, comprising:

a battery pack which is formed by combining a number of storage batteries, said battery pack being used as a drive power source for a movable body;

a ventilation part for supplying cool air toward said battery pack;

a detection unit which is disposed in the vicinity of said battery pack to detect condition information about a voltage, a temperature and a pressure of a storage battery and an ambient temperature, said detection unit having an analog-digital conversion function of converting an obtained detection value from an analog value into a digital value and a signal sending function of successively sending said digital value in a serial method;

a movable body signal control part for controlling a discharging current of a battery, a charging current of the battery, a regenerative current to the battery which is generated during a braking operation of the movable body, and various types of information regarding the movable body;

a battery condition judging unit including a computation part for executing computations based on information from said detection unit and the movable body signal control part, a charging control signal part for supplying a charging control signal to a battery charger whose input source is an alternating current power source, a remaining capacity judging signal part for supplying a capacity judging signal to a display part, a lifetime judging signal part for supplying a lifetime judging signal to the display part, and a movable body control signal part for supplying a movable body control signal to said movable body signal control part;

the battery charger for charging said battery pack, under the control of the charging control signal from said battery condition judging unit; and the display part for displaying a remaining capacity of the battery and a result of lifetime judgment, under the control of the capacity judging signal and the lifetime judging signal from the battery condition judging unit.

2. The condition managing system for a storage battery of claim 1, wherein the battery pack is formed by a plurality of the module batteries each comprising a number of cells;

the voltage of a battery is detected for each one of the module batteries;

a battery temperature is detected by at least two temperature sensors, one which is disposed at least within one of the cells of a battery module in which heat is built up from a neighboring battery module, and the other which is disposed at least within one of the cells of a battery module in which heat is not built up from a neighboring battery module;

a battery pressure is detected by a pressure sensor which is disposed at least within one of the cells of a battery module in which heat is built up from a neighboring battery module; and the ambient temperature is detected by a temperature sensor which is disposed in the vicinity of an air inlet of the ventilation part.

3. The condition managing system for a storage battery of claim 1, wherein a polar column of a cell which forms the battery pack comprises a current line fixing part for supplying a current and a fixing part for a battery voltage measuring line; and said fixing part for a battery voltage measuring line allows a battery voltage measuring line to be attached to a threaded opening which is disposed on a top portion of the polar column, independently of said current line fixing part, so that the battery voltage is detected.

4. The condition managing system for a storage battery of claim 2, wherein insertion holes are formed in lids of battery jars of cells which form the battery pack to a depth near top portions of polar plates of batteries, and the temperature sensors are disposed in the insertion holes, so that the battery temperature is detected.

5. The condition managing system for a storage battery of claim 2, wherein a through hole is formed in the lids of the battery jars of the cells which form the battery pack a and voltage-current conversion apparatus is disposed in the through hole, so that the battery pressure is detected.

6. The condition managing system for a storage battery of claim 1, wherein the number of the cells of the plurality of the module batteries which form the battery pack are each formed by a sealed nickel/hydrogen storage battery.

7. A method of charging up a storage battery for a system which comprises: a battery pack which is formed by combining a number of storage batteries, said battery pack being used as a drive power source for a movable body; a ventilation part for supplying cool air toward the battery pack; a detection unit which is disposed in the vicinity of said battery pack to detect condition information about a voltage, a temperature and a pressure of a storage battery and an ambient temperature, said detection unit having an analog-digital conversion function of converting an obtained detection value from an analog value into a digital value and a signal sending function of successively sending said digital value in a serial method; a movable body signal control part for controlling a discharging current of a battery, a charging current of the battery, a regenerative current to the battery which is generated during a braking operation of the movable body, and various types of information regarding the movable body; a battery condition judging unit including a computation part for executing computations based on information from said detection unit and the movable body signal control part, a charging control signal part for supplying a charging control signal to a battery charger whose input source is an alternating current power source, a remaining capacity judging signal part for supplying a capacity judging signal to a display part, a lifetime judging signal part for supplying a lifetime judging signal to the display part, and a movable body control signal part for supplying a movable body control signal to the movable body signal control part; the battery charger for charging said battery pack, under the control of the charging control signal from said battery condition judging unit; and the display part for displaying a remaining capacity of the battery and a result of lifetime judgment, under the control of the capacity judging signal and the lifetime judging signal from the battery condition judging unit, the method being characterized in that:

charging of the battery pack which is performed by the battery charger which is controlled by the charging control signal from said battery condition judging unit consists of two parts, a first charging period and a second charging period, and charging is performed using charging power until a result of a first remaining capacity judgment reaches about 90% to 100% of an initial capacity during the first charging period, the second charging period is thereafter started during which charging is continued using a very small charging current until a result of a second remaining capacity judgment reaches about 100% to 110% of the initial capacity, and charging is then stopped.

8. The method of charging up a storage battery of claim 7, wherein during charging of the battery pack which is performed by the battery charger which is controlled by the charging control signal from said battery condition judging unit, shifting from said first charging period to the second charging period is performed when it is detected that a result of judgment of a temperature increase rate of a battery reaches or exceeds a predetermined value, and the predetermined value which is used to judge said temperature increase rate is corrected based on the charging current and the battery temperature.

9. A system for judging a remaining capacity of a storage battery for use within a system which comprises: a battery pack which is formed by combining a number of storage batteries, the battery pack being used as a drive power source for a movable body; a ventilation part for supplying cool air toward the battery pack; a detection unit which is disposed in the vicinity of said battery pack to detect condition information regarding a battery such as a voltage, a temperature and a pressure of a storage battery and an ambient temperature, the detection unit having an analog-digital conversion function of converting an obtained detection value from an analog value into a digital value and a signal sending function of successively sending said digital value in a serial method; a movable body signal control part for controlling a discharging current of a battery, a charging current of the battery, a regenerative current to the battery which is generated during a braking operation of the movable body, and various types of information regarding the movable body; a battery condition judging unit including a computation part for executing computations based on information from said detection unit and the movable body signal control part, a charging control signal part for supplying a charging control signal to a battery charger whose input source is an alternating current power source, a remaining capacity judging signal part for supplying a capacity judging signal to a display part, a lifetime judging signal part for supplying a lifetime judging signal to the display part, and a movable body control signal part for supplying a movable body control signal to the movable body signal control part; the battery charger for charging said battery pack, under the control of the charging control signal from said battery condition judging unit; and the display part for displaying a remaining capacity of the battery and a result of lifetime judgment, under the control of the capacity judging signal and the lifetime judging signal from the battery condition judging unit, the system for judging a remaining capacity of a storage battery being characterized in that:

said battery condition judging unit judges a remaining capacity by combining a result of a first remaining capacity judgment which is based on a discharged electricity quantity and a result of a second remaining capacity judgment which is based on a discharging voltage, and a remaining capacity which is yielded by the first remaining capacity judgment is adopted while the remaining capacity remains from around 100% to around 20% of an initial capacity but a remaining capacity which is yielded by a second remaining capacity judgment is adopted when the remaining capacity according to the first remaining capacity judgment varies from around 20% to around 0% after dropped to around 20% of the initial capacity.

10. A system for judging a lifetime of a storage battery for a system which comprises: a battery pack which is formed by combining a number of storage batteries, the battery pack being used as a drive power source for a movable body; a ventilation part for supplying cool air toward the battery pack; a detection unit which is disposed in the vicinity of said battery pack to detect condition information regarding a battery such as a voltage, a temperature and a pressure of a storage battery and an ambient temperature, the detection unit having an analog-digital conversion function of converting an obtained detection value from an analog value into a digital value and a signal sending function of successively sending said digital value in a serial method; a movable body signal control part for controlling a discharging current of a battery, a charging current of the battery, a regenerative current to the battery which is generated during a braking operation of the movable body, and various types of information regarding the movable body; a battery condition judging unit including a computation part for executing computations based on information from said detection unit and the movable body signal control part, a charging control signal part for supplying a charging control signal to a battery charger whose input source is an alternating current power source, a remaining capacity judging signal part for supplying a capacity judging signal to a display part, a lifetime judging signal part for supplying a lifetime judging signal to the display part, and a movable body control signal part for supplying a movable body control signal to the movable body signal control part; the battery charger for charging said battery pack, under the control of the charging control signal from said battery condition judging unit; and the display part for displaying a remaining capacity of the battery and a result of lifetime judgment, under the control of the capacity judging signal and the lifetime judging signal from the battery condition judging unit, the system for judging a lifetime of a storage battery being characterized in that:

during a judgment of a lifetime performed by said battery condition judging unit, an average value of total data is calculated based on battery condition information which is obtained regarding each module battery, said average value is compared with each module battery, and if a difference between the two is equal to or larger than a predetermined value, it is judged that the battery is defective because of a deteriorated capacity or shorting or that the lifetime of the battery is reached.

11. The condition managing system for a storage battery of claim 2, wherein the number of the cells of the plurality of the module batteries which form the battery pack are each formed by a sealed nickel/hydrogen storage battery.

12. The condition managing system for a storage battery of claim 3, wherein the number of the cells of the plurality of the module batteries which form the battery pack are each formed by a sealed nickel/hydrogen storage battery.

13. The condition managing system for a storage battery of claim 4, wherein the number of the cells of the plurality of the module batteries which form the battery pack are each formed by a sealed nickel/hydrogen storage battery.

14. The condition managing system for a storage battery of claim 5, wherein the number of the cells of the plurality of the module batteries which form the battery pack are each formed by a sealed nickel/hydrogen storage battery.

* * * * *